July 10, 1951     F. O. KOMPASS     2,560,115
TOASTER
Filed Jan. 28, 1947
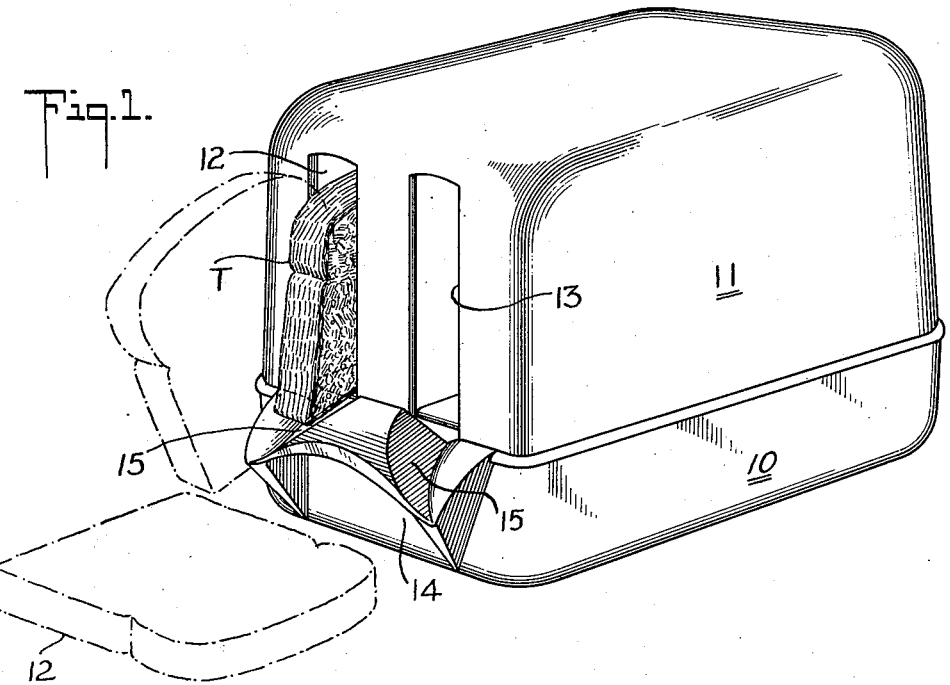
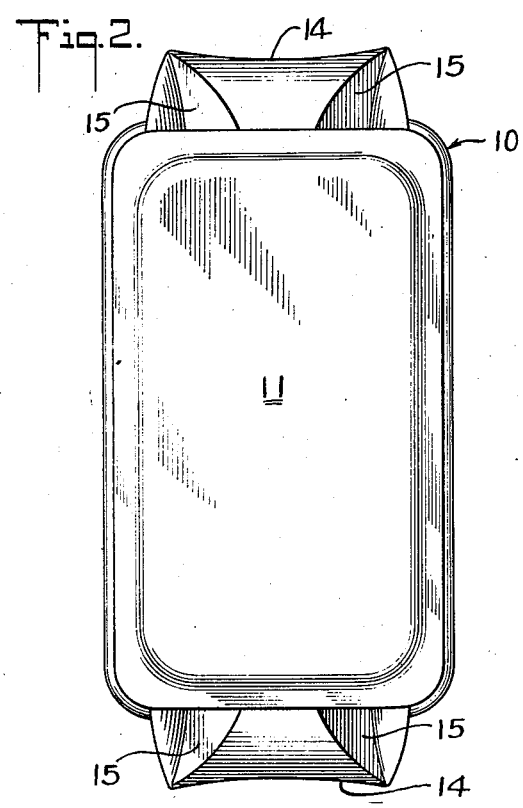
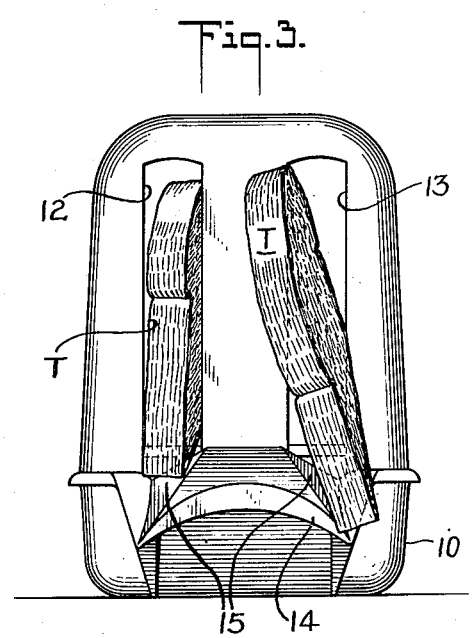
INVENTOR
Frank O. Kompass
BY
A. H. Golden
ATTORNEY Patented July 10, 1951

2,560,115

UNITED STATES PATENT OFFICE 2,560,115

TOASTER

Frank O. Kompass, New York, N. Y., assignor to The Yale & Towne Manufacturing Company, Stamford, Conn., a corporation of Connecticut Application January 28, 1947, Serial No. 724,910

2 Claims. (Cl. 99—391)

This invention relates to a toaster, and more particularly to a toaster of the type disclosed in my application Ser. No. 706,975 filed October 31, 1946.

In toasters of the particular class, a slice of bread is toasted while passing between a pair of heating elements and is then allowed to drop downwardly onto a plate or table, as those skilled in the art fully appreciate. It has been found that when the bread slices are allowed to drop naturally from the toaster, they roll end on end, frequently for substantial distances. In my earlier application I have provided means for preventing such movement of the bread upon ejection from the toaster. In this application, I show and claim means much more simple and effective than the means of my earlier application.

As already generally indicated, it is the object of my invention to provide means for directing the slices of toasted bread so that they will not roll end on end, but will rather be deposited on the flat surfaces of the bread and close to the toaster.

As a feature of my invention, I provide means that are applied to the toaster for guiding the slices of toast so that motion is imparted thereto in a direction to effect the movement of the slices so that they will be deposited on their flat surfaces adjacent the toaster.

Even more particularly, as a feature of my invention, cam surfaces are provided for imparting sidewise movement or spin to the lower edge of the toast so that each slice of toasted bread will tend to drop on its flat surface onto a plate or the like.

Even more particularly, as a feature of my invention, the cam surfaces are formed as handles for the toaster whereby the toaster may be carried from place to place.

I have thus outlined the general nature of my invention and its relation to the prior art in order that the description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as the basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a perspective view of a toaster embodying my invention, and showing the movement of a slice of toasted bread. Fig. 2 is a view looking downwardly on the toaster of Fig. 1, while Fig. 3 is an end elevation of the toaster showing two slices of toast emerging therefrom.

Referring now more particularly to the drawings, reference numeral 10 indicates a base for the toaster, preferably formed of a plastic material, to which is attached the upper casing portion 11, usually formed of metal plated with chromium. The toast moves through two passages 12 and 13 of the toaster as is fully discussed in my earlier application, and the slices of toasted bread T are ejected from the toaster at the ends of the passages for movement onto a plate, table or the like.

Where no guide means are provided for the bread, the toasted slices will drop vertically onto the table or plate and then roll end on end for quite some distance. It is to prevent such movement of the toast that I apply at each end of the toaster a cam member 14, as is best shown in Fig. 2. Actually, the cam members 14 may be formed as integral parts of the plastic base 10 to function as handles whereby the toaster may be carried from place to place.

The upper surface of each cam member 14 is formed as fully and clearly shown in Fig. 1 to provide a downwardly sloping surface 15 opposite each of the passages 12 and 13. Each sloping surface 15 slopes not only downwardly, but to one side of the toaster.

As seen in Fig. 3, a slice of toast T will slide downwardly on a surface 15 when leaving one of the passages 12, 13 and will be deflected to one side so that actual side or lateral motion will be imparted to the lower edge of the slice of toast. This lateral motion or partial spin will tend to prevent end on end movement of the slice of toast, and will actually compel the toast to drop into the flat position illustrated in dash and dotted lines in Fig. 1 and onto the table or plate. It is interesting to note that the deflection and lateral motion imparted to the lower edge is of such nature that the slice of bread will drop closely to the toaster and on the plate or table, and will have practically no movement away from the toaster. This has been found by actual experience over a long period of time. Those skilled in the art will appreciate that through a simple adaptation of the usual toaster base 10, I am able to contribute movement of the toast in a manner that has long been sought in this art. I believe that the value of my invention and the simplicity thereof will now be quite apparent to those skilled in the art.

I now claim:

1. In a toaster of the class in which a piece of toast is fed endwise on its bottom edge through a passage between a pair of heating elements and then released for a vertical drop onto a plate or the like, a cam member positioned at the end of the passage and on which the leading end of the bread is moved as the bread leaves the passage, said cam member having a surface for receiving the lower edge of the bread as it leaves the passage a portion of said surface being inclined downwardly and toward one side of the passage whereby to contribute a side movement and spin to the lower edge of the bread as the bread slides on said cam surface so that the bread will tend to drop on its flat surface onto the plate or the like rather than roll on its edge.

2. In a toaster of the class in which a piece of toast is fed endwise on its bottom edge through a passage between a pair of heating elements and then released for a vertical drop onto a plate or the like, a support surface on which the lower edge of the bread is supported as it moves through the passage, a handle secured to said toaster at the end of the passage, the upper surface of said handle formed as a cam surface in juxtaposed relation to said support surface and onto which the leading end of the bottom edge of the bread is moved as the bread leaves the support surface, said cam surface having a portion of its surface inclined downwardly from that portion on which the bread is first moved and toward one side of the passage whereby to contribute a side movement and spin to the lower edge of the bread so that the bread will tend to drop on its flat surface onto the plate or the like rather than roll on its edge.

FRANK O. KOMPASS.

REFERENCES CITED

The following references are of record in the file of this patent:

UNITED STATES PATENTS

| Number | Name | Date |
|---|---|---|
| 1,538,864 | Morrison | May 19, 1925 |
| 1,708,522 | Pross | Apr. 9, 1929 |
| 1,963,924 | Smith | June 19, 1934 |
| 2,151,790 | Mitchell | Mar. 28, 1939 |
| 2,195,638 | Anderson | Apr. 2, 1940 |
| 2,250,427 | Vannucci | July 22, 1941 |
| 2,387,817 | Wales | Oct. 30, 1945 |